(12) United States Patent
Saputra

(10) Patent No.: US 8,904,067 B2
(45) Date of Patent: Dec. 2, 2014

(54) ADAPTIVE MULTI-THREADED BUFFER

(75) Inventor: Erwien Saputra, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 212 days.

(21) Appl. No.: 13/419,306

(22) Filed: Mar. 13, 2012

(65) Prior Publication Data

US 2013/0246672 A1  Sep. 19, 2013

(51) Int. Cl.
*G06F 3/00* (2006.01)
*G06F 13/00* (2006.01)

(52) U.S. Cl.
USPC ............... 710/56; 710/52; 710/53; 710/54; 710/55; 710/57; 711/170; 711/171; 711/172; 711/173

(58) Field of Classification Search
None
See application file for complete search history.

(56) References Cited

U.S. PATENT DOCUMENTS

| | | | | |
|---|---|---|---|---|
| 5,381,528 | A * | 1/1995 | Brunelle | 710/56 |
| 5,553,267 | A * | 9/1996 | Herlihy | 711/147 |
| 5,740,467 | A * | 4/1998 | Chmielecki et al. | 710/56 |
| 5,802,028 | A * | 9/1998 | Igarashi | 369/53.24 |
| 5,974,483 | A * | 10/1999 | Ray et al. | 710/52 |
| 6,047,001 | A * | 4/2000 | Kuo et al. | 370/428 |
| 6,134,607 | A * | 10/2000 | Frink | 710/22 |
| 6,304,924 | B1 * | 10/2001 | Varma | 710/52 |
| 6,801,991 | B2 * | 10/2004 | Moller et al. | 711/173 |
| 6,938,132 | B1 * | 8/2005 | Joffe et al. | 711/156 |
| 7,007,146 | B2 * | 2/2006 | Romanufa et al. | 711/165 |
| 7,215,679 | B2 * | 5/2007 | Pugel | 370/412 |
| 7,246,182 | B2 * | 7/2007 | Forin et al. | 710/54 |
| 7,497,271 | B2 * | 3/2009 | Moeller et al. | 173/1 |
| 7,546,480 | B1 * | 6/2009 | Swenson et al. | 713/400 |
| 7,716,396 | B1 * | 5/2010 | Liu et al. | 710/52 |
| 7,743,182 | B2 * | 6/2010 | Duisenberg | 710/52 |
| 7,882,285 | B2 * | 2/2011 | Harding et al. | 710/56 |
| 8,009,174 | B2 | 8/2011 | Beric et al. | |
| 8,015,377 | B2 * | 9/2011 | Kano | 711/162 |
| 8,095,727 | B2 * | 1/2012 | Rushworth et al. | 711/110 |
| 2002/0075273 | A1 * | 6/2002 | Marshall et al. | 345/581 |
| 2003/0120886 | A1 * | 6/2003 | Moller et al. | 711/173 |
| 2003/0126322 | A1 * | 7/2003 | Micalizzi et al. | 710/52 |

(Continued)

OTHER PUBLICATIONS

"Lock-Free Garbage Collection for Multiprocessors" by Maurice P. Herlihy and J. Eliot B. Moss, 1991 ACM 089791-438-419110007/0229.*

(Continued)

*Primary Examiner* — Henry Tsai
*Assistant Examiner* — Jing-Yih Shyu
(74) *Attorney, Agent, or Firm* — James Sfekas; Katherine Drakos; Micky Minas

(57) ABSTRACT

An adaptive multi-thread buffer supports multiple writer process and reader processes simultaneously without blocking. Writer processes are assigned a reserved write slot using a writer index that is incremented for each write request. When a reserved write slot is not null, the buffer is resized to make room for new data. Reader processes are assigned a reserved read slot using a reader index that is incremented for each read request. When data is read out to the reader process, the read slot content is set to null. When a writer process attempts to write null data to a write slot, the buffer replaces the null write data with an empty value object so that content of the buffer is null only for empty slots. When an empty value object is read from a slot, the buffer replaces the content with null data to send to the reader process.

16 Claims, 13 Drawing Sheets

(56) References Cited

U.S. PATENT DOCUMENTS

| | | | |
|---|---|---|---|
| 2004/0168035 A1* | 8/2004 | Romanufa et al. | 711/165 |
| 2006/0048162 A1* | 3/2006 | Boult | 719/310 |
| 2006/0236011 A1* | 10/2006 | Narad et al. | 710/240 |
| 2009/0187682 A1 | 7/2009 | Arndt | |
| 2009/0248922 A1* | 10/2009 | Hinohara et al. | 710/56 |
| 2010/0281070 A1* | 11/2010 | Chan et al. | 707/803 |
| 2010/0332755 A1* | 12/2010 | Bu et al. | 711/119 |
| 2011/0131352 A1* | 6/2011 | Allen et al. | 710/55 |

OTHER PUBLICATIONS

"Lock-Free Linked Lists Using Compare-and-Swap" by John D. Valois, PODC 95 Ottawa Ontario CA © 1995 ACM.*

"Nonblocking Memory Management Support for Dynamic-Sized Data Structures" by Maurice Herlihy, Victor Luchangco, Paul Martin, and Mark Moi, ACM Transactions on Computer Systems, vol. 23, No. 2, May 2005, pp. 146-196.*

"Safe Memory Reclamation for Dynamic Lock-Free Objects Using Atomic Reads and Writes" by Maged M. Michael, PODC 2002. Jul. 21-24, 2002, Monterey, California, USA.*

"Optimised Lock-Free FIFO Queue" by Dominique Faber, Yann Orlarey, and Stepbane Lctz, GRAME—Computer Music Research Lab. Technical Report—TR010101, Sep. 30, 2003.*

National Instruments, "Deterministic Data Streaming in Distributed Data Acquisition Systems," (downloaded from: http://zone.ni.com/devzone/cda/tut/p/id/3245), Jul. 1, 2008, (8 pages).

Unknown, "Alternatives to Locking," (downloaded from http://www.makelinux.com/ldd3/chp-5-sect-7 on Dec. 29, 2011), (7 pages).

Lee, Patrick, et al., "A Lock-Free, Cache-Efficient Multi-Core Synchronization Mechanism for Line-Rate Network Traffice Monitoring," Parallel & Distributed Processing (IPDPS), 2010 IEEE International Symposium, Apr. 19-23, (downloaded from http://ieeexplore.ieee.org/stamp/stamp.jsp?tp=&arnumber=5470368), 2010, (12 pages).

Wiggers, Maarten, et al., "Computation of Buffer Capacities for Throughput Constrained and Data Dependent Inter-Task Communication," Design, Automation and Test in Europe, 2008, (downloaded from http://ieeexplore.ieee.org/stamp/stamp.jsp?tp=&arnumber=4484749), 2008.

* cited by examiner

ADAPTIVE MULTI-THREADED BUFFER

BACKGROUND

A producer/consumer system is a classic problem in which multiple processes work together. The producers generate data and store the data to a queue. The consumers access the queue to consume the data generated by the producers. There may be more than one or more producer and/or consumer. Typical solutions utilize locking to share data between a producer and consumer. The producers and consumers may store and access the data in arbitrary pattern. As a result, the producer does not necessarily store data before the consumer requests access to the data. The consumer determines whether the content of the queue has been inserted by the producer or is old data or null data.

An additional problem occurs when the producers are more active than the readers. The producers may fill the queue faster than the consumers access the data. As a result, the queue may be filled, which blocks additional producers from inserting more data. Until the consumers read data from the queue and create more space, the producers' data may be lost or the producer may be stalled.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a buffer receives a request from a writer process to write data to a buffer. The buffer may be, for example, an array or a circular linked list. The buffer increments a writer index to a next slot in the buffer and reserves a write slot for the writer process. The data from the writer process is written to the reserved write slot. The buffer may also identify when the content of the slot to be written is not null. The buffer may be resized if it is full, which is indicated when the reserved write slot content is not null.

The buffer identifies when the data from the writer process is null data. The null data is substituted with an empty value object, and the empty value object is written to the first write slot.

The buffer may receive a request from a second writer process to write data to the buffer. The buffer then increments the writer index to a second write slot in the buffer and reserves the second write slot for the second writer process. The data from the second writer process is then written to the second write slot.

When the buffer receives a request from a reader process to read data from the buffer, it increments a reader index and reserves a read slot for the reader process. The content of the read slot is then provided to the reader process. If the reader index has been incremented and the content of the reader index is null, that means the writer has not has the chance to write the data. There are two checks when a process or thread tries to read data from the buffer. The read request is received by the buffer. The buffer checks if the internal buffer is empty by looking at whether the reader index equals to the writer index and the content is null. If it is empty, the buffer simply returns nothing and tells the requesting request that there is no data available. If it is not empty, the reader index is incremented and the buffer checks for the content of the reader slot. If it is empty that means the writer has not written any data, and the reader will spin, it continually checks the content of the slot until at one point it is not null. If the buffer determines that the read slot content is null, then the buffer evaluates whether the buffer has been resized. If the buffer has been resized, the reader index is incremented again and a new read slot is reserved for the reader process. The content of the new read slot is provided to the reader process. As data is provided to the reader process, the content of the read slot is set to null.

If the content of the read slot is an empty value object, the buffer replaces the empty value object with null data. The buffer then provides the null data to the reader process.

The buffer may be resized when an original buffer is determined to be full. The original buffer may be identified as full, for example, when content of a slot that is reserved for a new writer process is not null. A new buffer space is created. The new buffer may be larger than the old buffer by a preselected multiple or by a preselected number of slots. The new buffer size may be selected, for example, based upon a frequency of buffer resizing.

Data is then moved from slots in the original buffer to slots in the new buffer. The buffer sets a reader index to point to last slot in new buffer, and sets a writer index to point to last non-null element in new buffer. The slots in the original buffer are set to null as data is moved to slots in the new buffer. The original buffer is disposed of when all data has been moved. During resizing, writer processes and reader processes are blocked from reserving slots in the old buffer. After all data has been moved to the new buffer, the writer processes and reader processes are allowed to reserve slots in the new buffer.

A buffer state may be set to a resizing state prior to resizing. After all data has been moved to the new buffer, the buffer state is set to a non-resizing state.

The improvements disclosed herein enhance circular buffer usage by adding the ability to resize the buffer when the buffer is full, thus preventing the producers from completely blocked. The buffer utilizes the state of the object inside the circular buffer to prevent a race condition between the reader and the writer, because both can point to the same slot and attempt to change the information at the same time. The writer that requested an index earlier in time may insert the data later than other writers. The buffer utilizes the state of the object inside the buffer slots to prevent race condition.

The buffer unblocks writers from inserting the data by having an adaptive circular buffer that grows as needed.

Additionally, suspended readers or writers do not block other readers or other writers from accessing the buffer.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
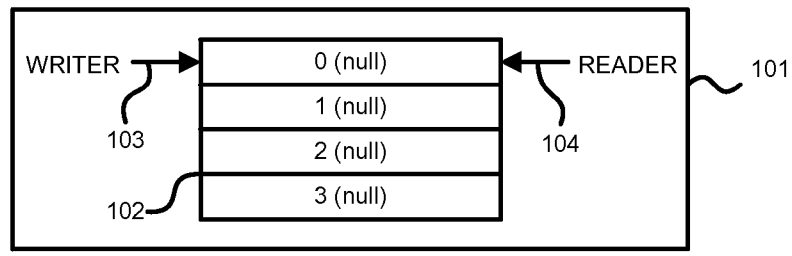
FIGS. 1A-1C illustrate a process for writing data to the buffer according to one embodiment.

FIG. 1A illustrates a multi-threaded buffer according to one embodiment. Multi-threaded buffer 101 includes a plurality of slots 102 for storing data. Buffer 101 allows multiple writers and multiple readers to access data from slots 102 simultaneously. Buffer 101 does not require locking when accessed by multiple writers and readers. The buffer automatically resizes itself when the rate at which data is stored by the writers significantly outpaces the rate at which data is consumed by the readers.

In one embodiment, buffer 101 may be implemented as an array or ordered collection. In other embodiments, buffer 101 may be implemented as a circular buffer. The data in the slots 102 are set to null to indicate that no data has been written to the slot (i.e. a NULL slot). To provide a lock free implementation, one embodiment uses a circular buffer, which may be implemented using an array or a circular linked list. In the example system described herein, an array is used.

Buffer 101 implements two index variables or pointers, a writer index 103 and a reader index 104. These indexes independently point to an element or slot in the array. Each writer and reader requests a slot in the buffer 101 before writing/reading data. The writer index 103 and the reader index 104 are incremented in a manner that ensures that no more than one writer accesses a slot at one time and, correspondingly, no more than one reader access each slot at one time. This is achieved by incrementing the reader and writer indices in an atomic manner. In one embodiment, an Interlocked Increment API is used to increment a value in memory in an atomic manner so that each thread can update that piece of memory and thereby guarantee that there will be no race condition. It is possible, however, for both one reader and one writer to access the same slot simultaneously. When a reader and a writer access the same slot at approximately the same time, the buffer may be in one of two states: the buffer may be about to be empty or the buffer is full.

Figure 1B:
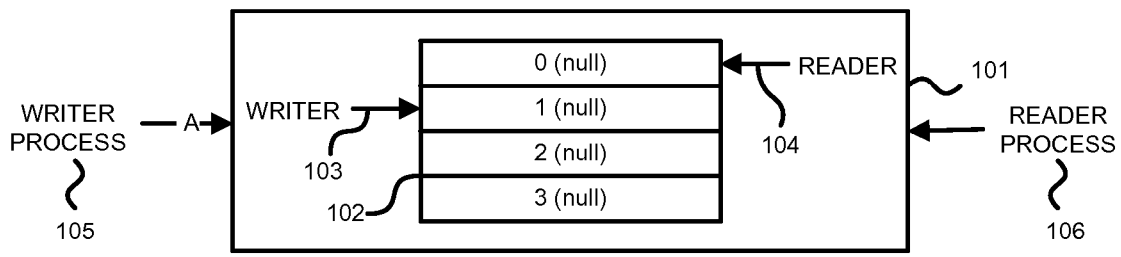
Figure 1C:
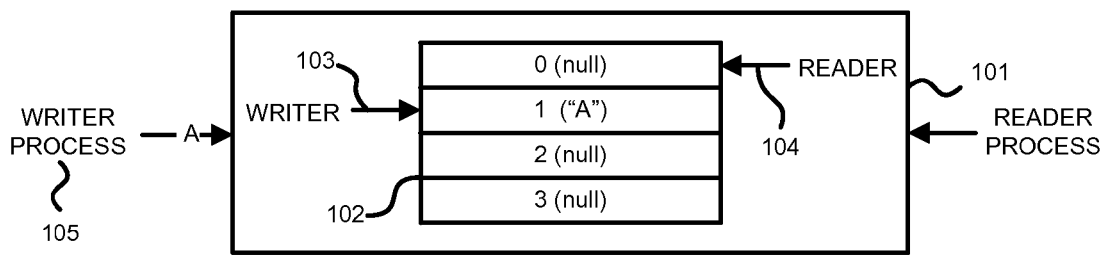

FIGS. 1A-1C illustrate a process for writing data to the buffer 101 according to one embodiment. When a writer process 105 wants to write data "A" to the buffer (FIG. 1B), the buffer will reserve a slot 102-1 by incrementing the index 103. This guarantees that only one writer process or thread will have this slot 102-1 in the buffer. The buffer checks whether the slot 102-1 is full or has a null value. If the slot is not null, then the buffer is full, and will be resized as discussed below. If the slot is null, then the data "A" is written to the reserved slot 102-1 (FIG. 1C). The buffer may then raise an event to notify reader process 106 that the buffer has data ready for consumption.

Figure 2A:
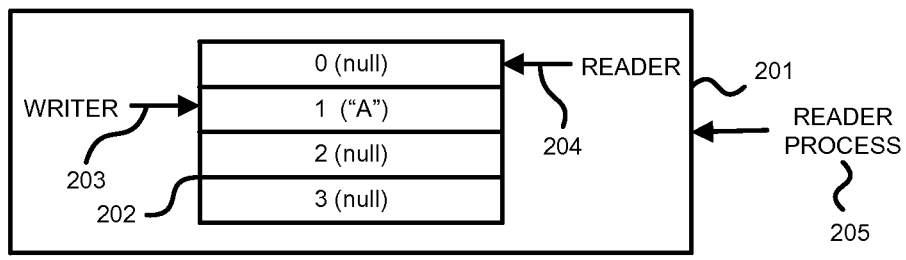
FIGS. 2A-2C illustrate a process to read data from the buffer according to one embodiment.
Figure 2B:
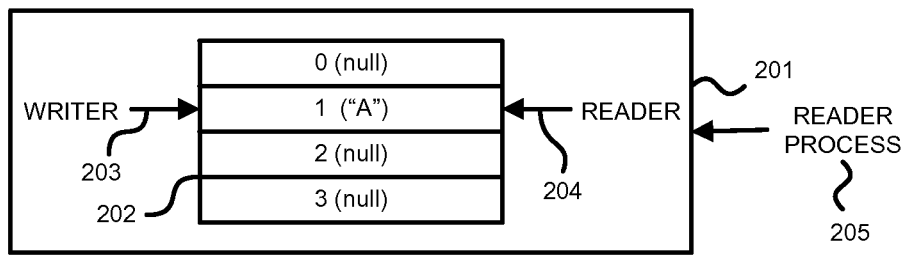
Figure 2C:
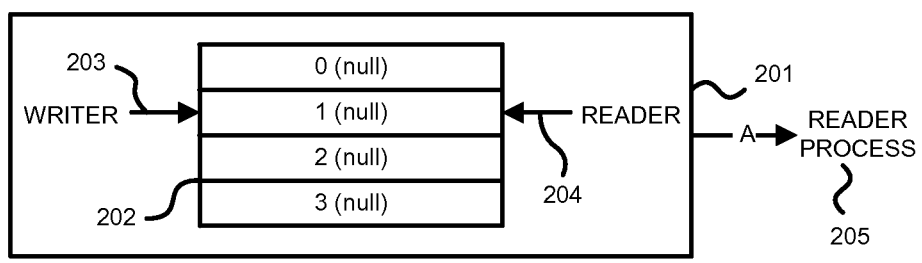

FIGS. 2A-2C illustrate a process to read data from the buffer according to one embodiment. A reader process 205 requests to read data from buffer 201 (FIG. 2A). The buffer checks whether any data is available (i.e. the buffer is not empty). A write index 203 points to the slot last assigned to a write process. The buffer 201 reserves a reader index 204 for the reader process by incrementing the reader index 204 (FIG. 2B) to point to slot 202-1. This guarantees that data from slot 202-1 will be read only by one reader process 205. Buffer 201 checks if the data has been written to this slot 202-1. If the slot is empty, which is indicated if the value of the slot is null, then a writer process has not written data to the slot yet, and the reader process will wait. If the slot is not empty (i.e. the slot has non-null content "A"), then the reader process reads the data and the buffer clears the slot by setting the value to null (FIG. 2C). If this read results in no stored values in any slots in the buffer, then the internal state of the buffer is changed to indicate that the buffer is now empty.

The implementation illustrated in FIGS. 1 and 2 uses an array as a circular buffer data type allows the buffer to increment the reader index and the writer index using an interlocked increment. To obtain the actual slot value in one embodiment, the value is modded by the size of the buffer. For example, if the buffer has 32 elements or slots, then reader index 33 actually points to slot number 1 (i.e. 33 mod 32). This allows both the reader index and the writer index to be incremented using unchecked constraint without a top boundary. When the index value overflows, the index is reset back to zero, which allows high performance index allocation.

After the writer index is incremented, the writer operation is blocked if the buffer is full. The reader index is also incremented, and the read operation blocked if the buffer is resizing. After the buffer has been resized, the writer and reader operations are signaled that they are no longer blocked. The writer and reader operations then request new slots assignments because the writer index and reader index are re-positioned during the resizing process, which is described in more detail below.

The buffer needs to know the state of the array element (i.e. the buffer slots) because one of the following conditions may occur. First, when a writer writes data, the buffer checks if the assigned slot already has data or not. If the slot already contains valid data, then the buffer knows that it is full. Second, the reader checks the slot content twice. The first check happens before the reader index is incremented. In the first check, if reader index and writer index are pointing to the same slot and the content is null, then the buffer is empty and no data is retrieved. The second check happens after the reader index has been incremented. In the second check, if the reader slot is null, then the writer has not had time to assign a value to the slot.

The buffer elements or slots should have a well-defined state to allow multiple readers and multiple writers to write/read data from the buffer without locking.

If the operating system suspends a writer thread before it has written data to a reserved slot (that is designated by a write index), and at the same time, a reader thread is assigned a reader index that matches the writer index, the buffer needs to know whether the writer had a chance to write the data or not before returning data to the reader. To help maintain the slot state, the buffer checks if the content of the slot is equal to a certain value (i.e. an empty value indicator) or not. If the slot value is equal to the empty indicator value, then the value in the slot is NULL. To simplify operation, a null value is used as the empty value indicator. In other embodiments, the empty value indicator may be any value instead of a null value as long as the usage of that empty value indicator is consistent (i.e. the buffer will always use the same value to indicate an empty slot value). The examples illustrated herein use null as the empty value indicator.

The null value is chosen because of its simplicity. It allows a compiler to more easily optimize the code and requires less overhead during resizing. For example, there is no need to initialize the empty slots in a resized buffer with non-null values.

Table 1 indicates how the buffer element state is treated by the reader and writer processes.

TABLE 1

|  | SLOT VALUE = (NULL) | SLOT VALUE ≠ (NULL) |
|---|---|---|
| WRITER PROCESS | The slot is ready to receive data. | The buffer is full. |
| READER PROCESS | The writer has reserved the slot, but has not written any data yet. (The reader will wait until the writer writes the data to the slot.) Or If the reader index and the writer index points to the same slot, the buffer may be empty. | The reader may read the data from the slot. |

The buffer utilizes the null value to indicate the state of the element or slot; however, the null value may also be the actual data value that a writer thread wants to write to the buffer. The buffer does not prevent writer threads from entering a null value to a slot in the buffer. To avoid confusion when a writer thread intentionally writes a null data value, the buffer creates a surrogate value that can be implemented, for example, as a private static variable, public static variable, constant, read-only field, etc. The surrogate value is referred to herein as EmptyValue, that represents a null value from the writer thread.

Figure 3A:
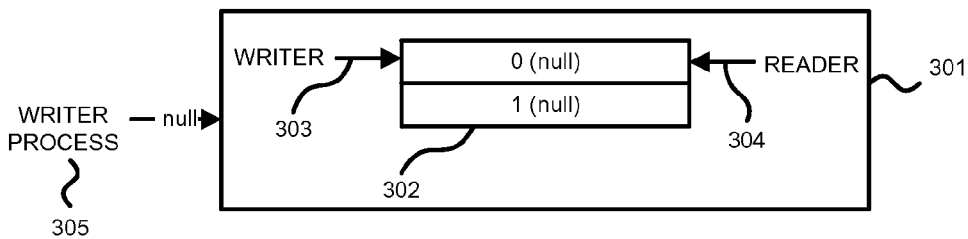
FIGS. 3A-3E illustrate a process for writing a null data value to the buffer and then reading the null data value from the buffer.
Figure 3B:
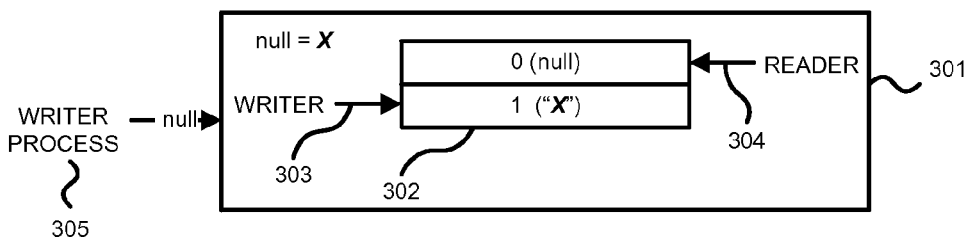

FIGS. 3A-3E illustrate a process for writing a null data value to the buffer and then reading the null data value from the buffer. In FIG. 3A, buffer 301 has empty slots 302, which are shown to be empty by storing a null value. Writer index 303 points to a top slot 302-0, and reader index 304 also points to top slot 302-0. A writer process or thread 305 attempts to write a null data value to the buffer 301. In FIG. 3B, buffer 301 increments the write index 303 to slot 302-1 and reserves that slot for writer process 305. Because the data value is a null value, buffer 301 substitutes the null data value with the EmptyValue, which is illustrated in FIG. 3B as "X", and stores the EmptyValue to slot 302-1. This allows buffer 301 to continue to use the null value to maintain the state of the buffer slots—i.e. if a null value is written to a buffer slot 302, that value always means that the slot is empty and never means that a stored data value was a null value.

Figure 3C:
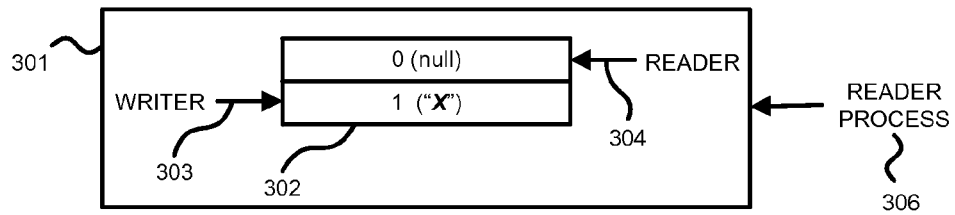
Figure 3D:
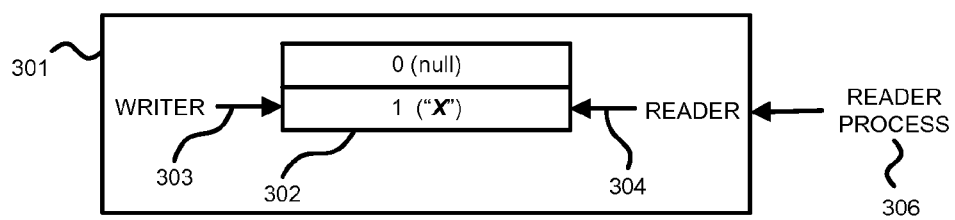
Figure 3E:
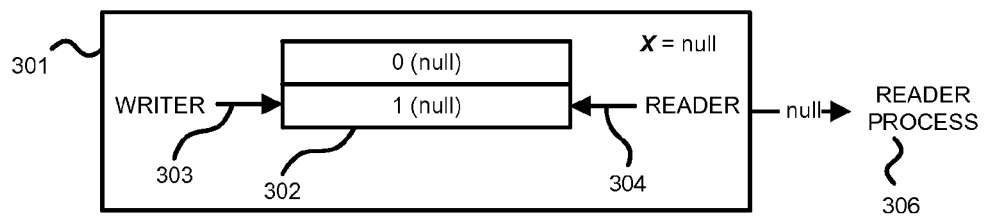

In FIG. 3C, a reader process or thread 306 attempts to read a value from buffer 301. The reader index 304 is incremented to slot 302-1 in FIG. 3D. Buffer 301 detects that the stored value "X" in slot 302-1 is a reference to EmptyValue. In FIG. 3E, buffer 301 converts the EmptyValue "X" to null and returns the null data value to reader process 306.

In the situation where the reader index and the writer index are pointing to the same slot and the value of the slot is null, the buffer is in one of two possible states. The writer thread may have been suspended before it had the chance to write data to the assigned slot, or the data has already been read from the assigned slot and the buffer is empty. This state is defined by the context of the reader. The context is determined based on whether or not the reader process has incremented the reader index. If the buffer read method has not yet incremented the reader index, and the reader index is equal to the writer index, and the writer index is null, then the buffer is empty.

If the buffer read method sees that the buffer is not empty, it increments the reader index. After incrementing the reader index, and both writer index and the reader index are pointing to the same slot, and the slot is null, then this situation means that the writer process was suspended before it had a chance to write data to the assigned slot. In this case, the reader will wait for the data to be written to the slot. This relies on the fact that both the reader index and the writer index are incremented using an interlocked increment. Each of the reader threads are guaranteed to have unique slot assignment among the readers, and each of the writer threads are guaranteed to have unique slot assignment among the writers. No readers are pointing to the same slot, but it is possible for a reader and a writer to point to the same lot.

Table 2 indicates how the state can be defined in the table.

TABLE 2

| | |
|---|---|
| | The Reader Index and Writer Index are identical, and the content of the element is null. |
| The check for null happens before the Reader Index is incremented. | The buffer is empty. |
| The check for null happens after the Reader Index is incremented. | The Writer was suspended by the operating system or the application before writing to the buffer. The reader thread will wait before reading the data. |

Figure 4A:
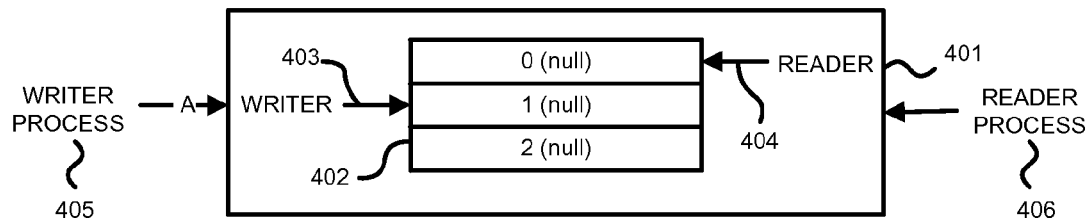
FIGS. 4A-4D illustrates a simultaneous write and read to a buffer.
Figure 4B:
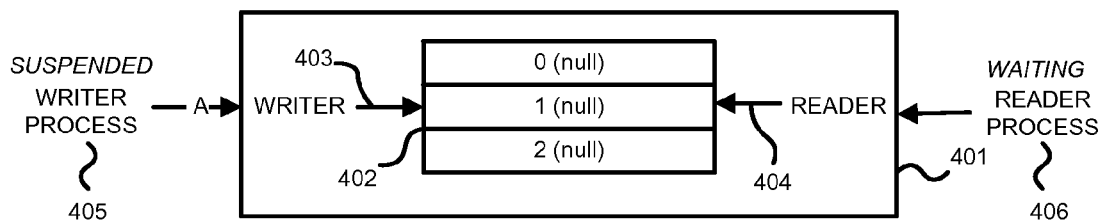

FIGS. 4A-4D illustrates a simultaneous write and read to a buffer 401. In FIG. 4A, a writer process 405 has reserved a slot 402-1 as indicated by writer index 403. The writer process 405 has been suspended or has not yet written its data "A" to the slot. If FIG. 4B, a reader process 406 attempts to read from buffer 401. The reader index 404 has been incremented to slot 402-1 so that the reader has reserved the same slot as writer process 405. The state of the buffer slot 402-1 is unique, and the value is null, which means the writer process 405 has not yet written the data, so the reader is waiting.

Figure 4C:
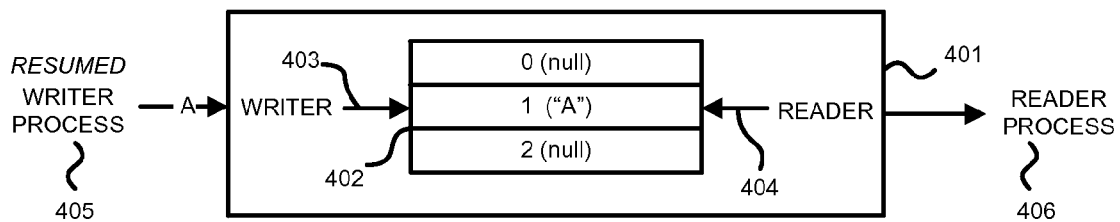
Figure 4D:
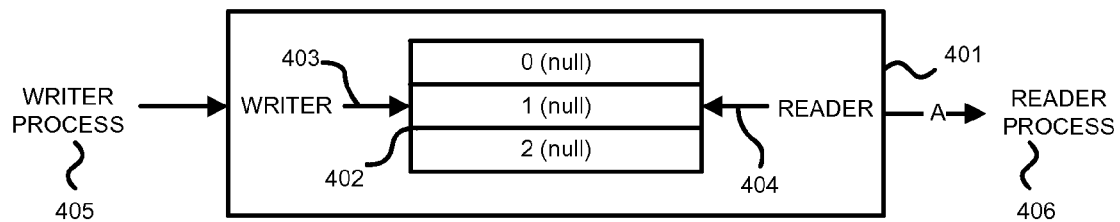

In FIG. 4C, the writer process 405 has resumed and has written the data to buffer 401. Once the data has been written to the reserved slot 402-1 (i.e. the value is no longer "null"), then the reader process 406 may immediately ready the data as shown in FIG. 4D. As the data is read, the slot value is changed back to null in the same step to indicate that the slot is again available. In one embodiment, the buffer uses an Interlocked Exchange that reads the slot content, exchanges the slot content with NULL, and returns the slot content to the reader process all at the same time. If the returned content is NULL, then the reader process knows that it has to "spin" or retry a read and wait for the writer to finish writing the data. The reader keeps exchanging the slot value with NULL until it receives not NULL from the slot. The read process and setting the slot value to null are performed in a single step, which enables the buffer to be cleared as quickly as it can, and enables writers to write to an empty slot.

In one embodiment, the buffer uses three different interlocked functions. An atomic increment operation, referred to as an Interlocked.Increment function in one embodiment, guarantees that each reader and writer is assigned a unique slot. An atomic exchange operation, referred to as an Interlocked.Exchange function in one embodiment, is used by the reader process to enable reading a slot value and setting the slot value to null in an atomic manner. An atomic compare and exchange operation, referred to as an Interlocked.Compare-Exchange function in one embodiment, is used by the writer process to enable the writer to make an attempt to write to a slot and—by the result of the interlocked operation—the writer knows whether the buffer is full or the write operation was successful.

FIGS. 5A-5H illustrate multiple writers simultaneously writing to the buffer. The write process involves reserving a slot 502 in the buffer 501 using a writer index that is incremented using an Interlocked.Increment function. The writer process then writes the data to the reserved slot. Due to the nature of multi-threaded operating system in a multi-processor environment, the thread or process that reserved a slot first in time, may not write the data to the slot earlier than another thread or process that reserves a slot later in time.

Figure 5A:
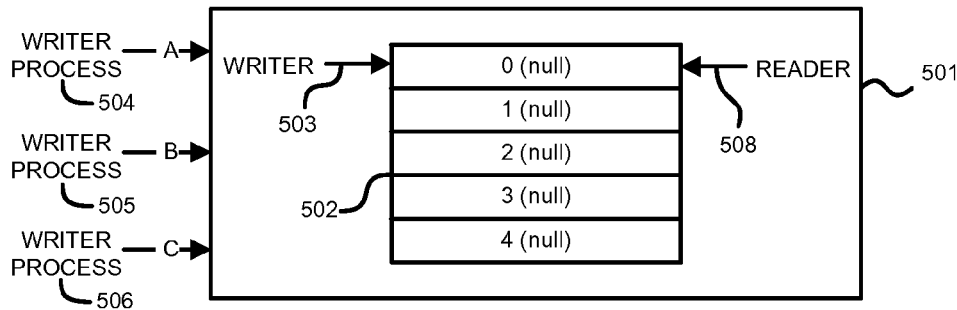
FIGS. 5A-5H illustrate multiple writers simultaneously writing to the buffer.
Figure 5B:
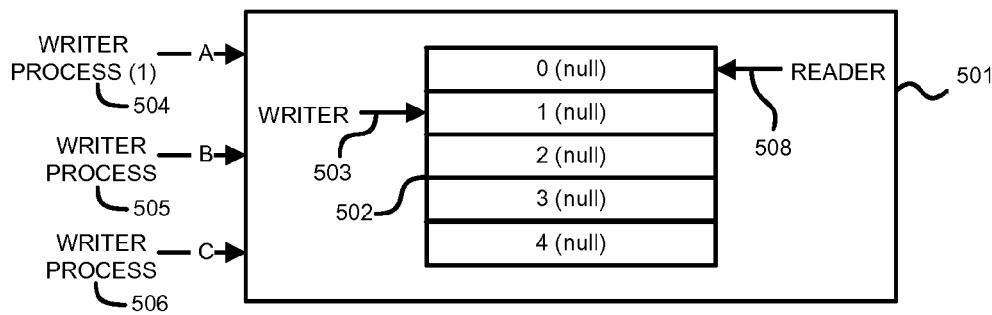
Figure 5C:
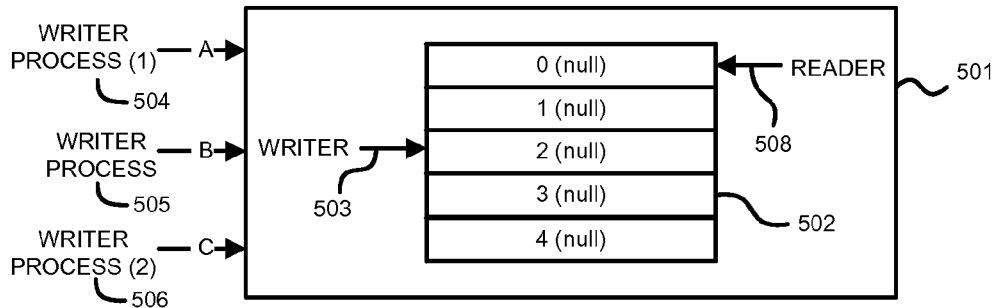

FIG. 5A illustrates three writer processes 504-506 attempting to write data to buffer 501. The buffer reserves a slot 502 for each writer process 504-506 that requests access based upon the current position of writer index 503, which is incremented on each write request. In FIG. 5B, writer process 504 requests a slot, writer index 503 is incremented, and writer process 504 is assigned slot 502-1. In FIG. 5C, before writer process 504 can write its data to slot 502-1, such as if the operating system suspends writer process 504, another writer process 506 requests a slot. Writer index 503 is incremented and slot 502-2 is reserved for writer process 506. Due to the nature of a multi-processor, multi-threaded system, writer process 506 may reserve a slot before writer process 505. It will be understood that the writer processes may request and be assigned slots 502 in any order.

Figure 5D:
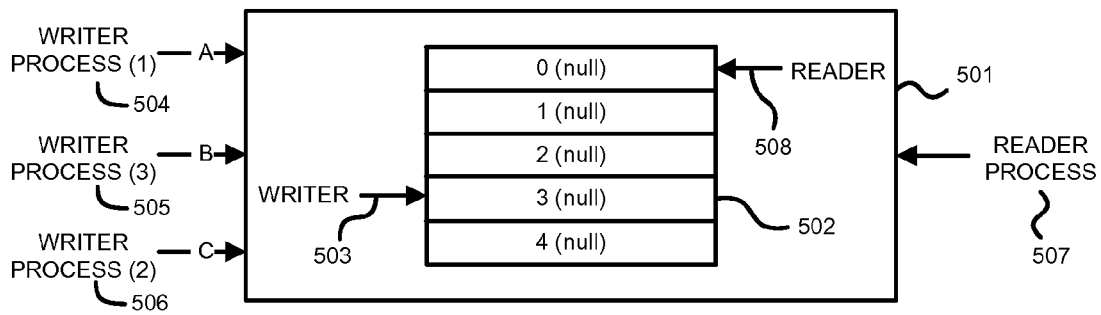
Figure 5E:
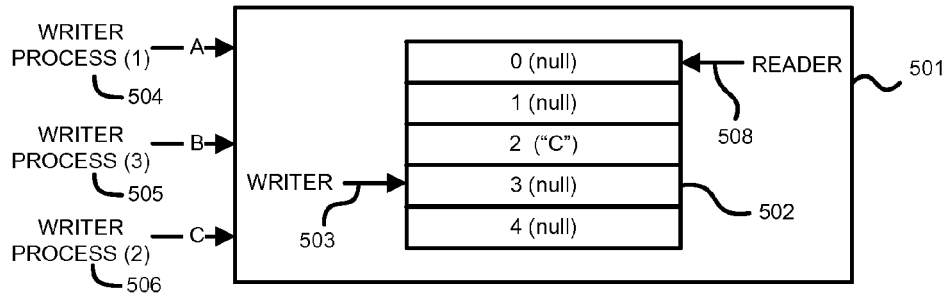

In FIG. 5D, writer process 505 requests a slot and buffer 501 increments writer index 503. Slot 502-3 is reserved for writer process 505. Each writer process 504-506 can write data to its reserved slot 502 simultaneously without blocking each other. In FIG. 5E, writer processes 504 and 505 are suspended by the operating system, for example, but writer process 506 is able to write its data "C" to assigned slot 502-2.

Figure 5F:
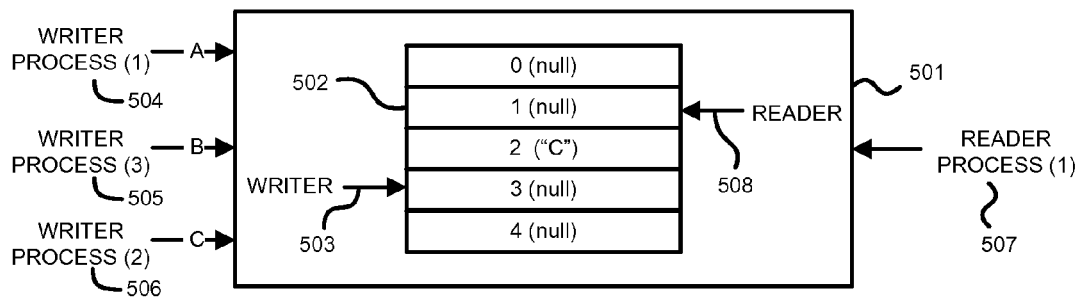

In FIG. 5F, reader process 507 requests to read data from buffer 501. Reader index 508 is incremented and reader process 507 is assigned slot 502-1. The value of slot 502-1 is null because the writer process 504 assigned to that slot is suspended. Accordingly, reader process 507 waits until the writer process 504 has time to write data to slot 502-1.

Figure 5G:
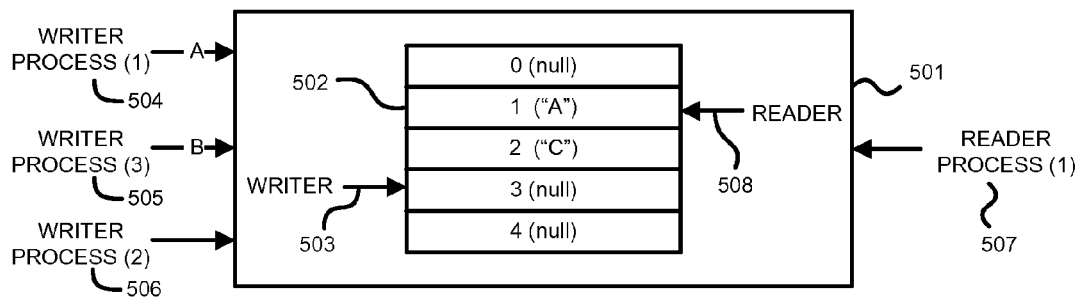
Figure 5H:
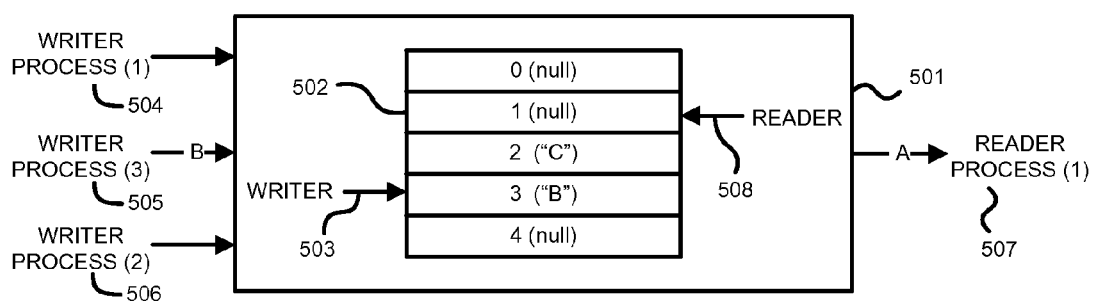

In FIG. 5G, writer process 504 writes its data "A" to slot 502-1. In FIG. 5H, reader process 507 reads out the data "A" from slot 502-1 and fills the slot with null in an atomic manner to indicate that the slot is now empty. When writer process 505 is active again, it writes its data "B" to assigned slot 502-3. The next time a reader process requests data, reader index 508 will be incremented to slot 502-2 and the data "C" will be read out.

FIGS. 6A-6D illustrate multiple readers that read from buffer 601 simultaneously. As noted above, when there are multiple writers to the buffer, there is no guarantee that a writer thread that reserves a slot 602 first in time will write data to that slot earlier that other writer threads that reserve other slots later in time. The buffer handles this case for reader threads as well.

Figure 6A:
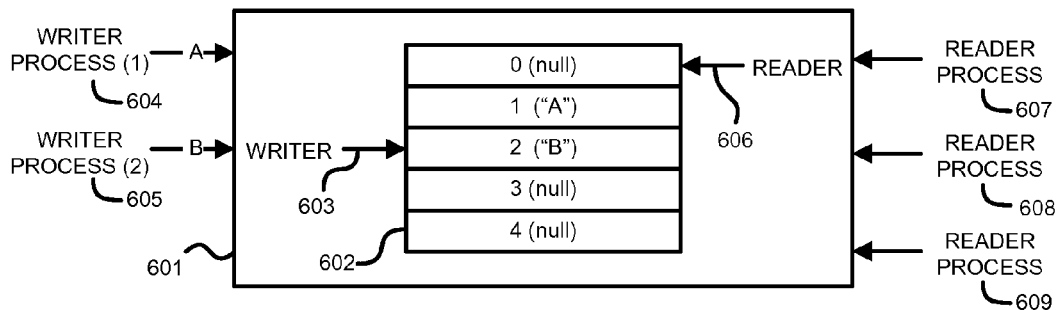
FIGS. 6A-6D illustrate multiple readers that read from buffer simultaneously.

In FIG. 6A, writer index 603 has been incremented to slot 602-2 in response to requests from writer processes 604, 605 to reserve buffer slots. Writer processes 604, 605 have stored data "A" and "B" to reserved slots 602-1 and 602-2, respectively. Reader index 606 is still at an initial position at slot 602-0 waiting for read requests from reader processes 607-608.

Figure 6B:
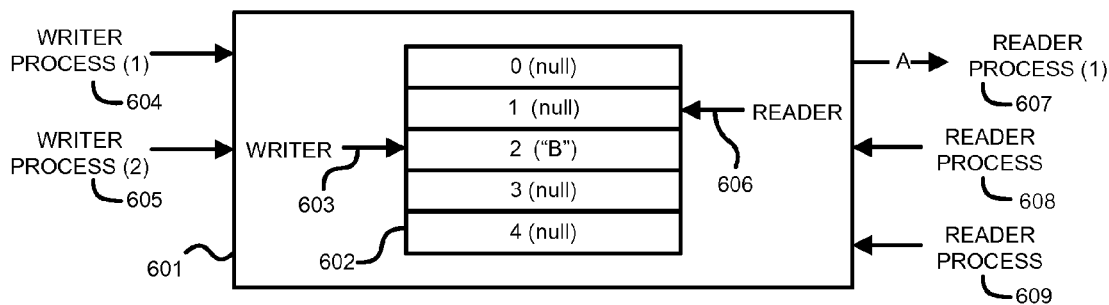
Figure 6C:
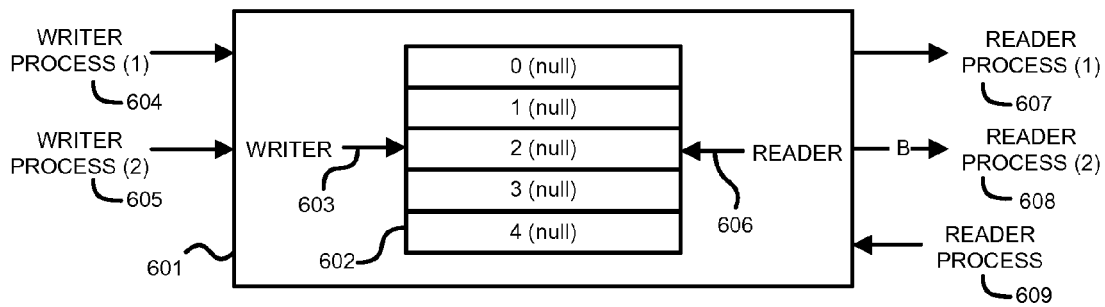

In FIG. 6B, reader process 607 requests to read data from buffer 601, which checks to ensure that the buffer is not empty. Reader index 606 is incremented to slot 602-1, which is reserved for reader process 607. Then the data "A" in slot 602-1 is read out to reader process 607 and slot 602-1 is set to null in a single step in an atomic manner. In FIG. 6C, reader process 608 requests to read data from buffer 601. Again, buffer 601 verifies that it is not empty. Reader index 606 is incremented to slot 602-2, which is reserved for reader process 608. Then the data "B" in slot 602-2 is read out to reader process 608 and the content of slot 602-2 is set to null in a single step in an atomic manner.

If the data "A" had not been written to slot 602-1 prior to the data "B" being written to slot 602-2, reader process 608 would be able to immediately read out the data from its reserved slot without waiting for reader process 607 to complete its read. The reader processes are able to read data as soon as the data is available in the assigned slot. Accordingly, in the cases where there are multiple writer processes and/or multiple reader processes, a suspended writer does not block other writers and a waiting reader does not block other readers.

Figure 6D:
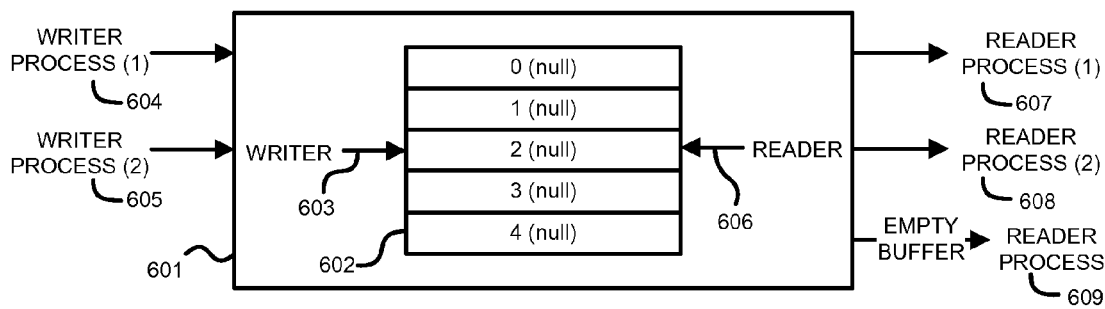

In FIG. 6D, a third reader process 609 requests data from buffer 601, which sees that reader index 606 is equal to writer index 603. Also, the value in the slot that reader index 606 and writer index 603 are pointing to is null because the data has already been read out to reader process 608. Instead of incrementing the reader index 606 again, buffer 601 knows that the slots are empty and simply returns an empty buffer message without reading any value.

The buffer maintains a set of states, which include full, partially full, and empty. When the buffer is empty, the buffer identifies this state when the reader index and the writer index are pointing to the same slot, and the content of the slot is null. When the buffer is full, the buffer identifies this state when a writer thread reserves a write index and the slot that it reserves is not null. This means that a reader thread has not read the data yet and the buffer will be resized.

Figure 7A:
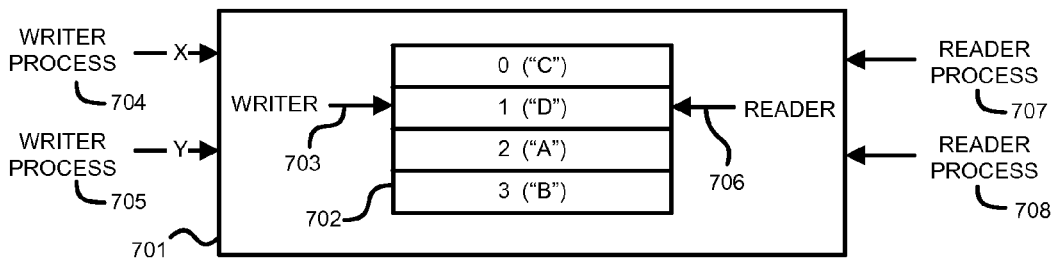
FIGS. 7A-7G illustrate resizing a buffer when writer processes discover that the buffer is full.

FIGS. 7A-7G illustrate resizing a buffer 701 when writer processes discover that the buffer is full. In FIG. 7A, internal circular buffer slots 702 are full. The last element written was data "D" on slot 702-1 as indicated by the position of the writer index 703. Two new writer processes 704, 705 and two reader processes 707, 708 are attempting to access the buffer 701.

Figure 7B:
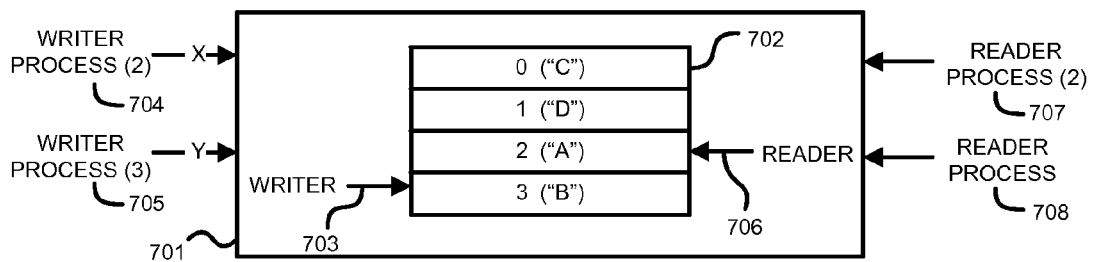

In FIG. 7B, writer index 703 has been incremented twice to assign slots 702-2 and 702-3 to writer processes 704, 705, respectively. Both writer processes 704, 705 check the content of the assigned slots and find that the reserved slots are not null. This means the buffer is full and needs to be resized. At the same time, the two reader processes 707, 708 also attempt reserve a slot to read, but only one reader process 707 was able to reserve slot 702-2.

Figure 7C:
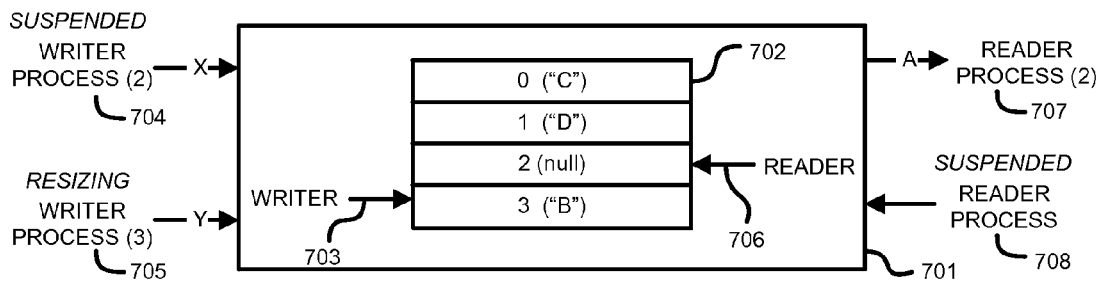

In FIG. 7C, writer processes 704, 705 attempt to change the state of buffer 701 to indicate that the buffer is resizing. In one embodiment, the state of buffer 701 is changed using an interlocked-compare-exchange operation to ensure that only one thread can change the state. As illustrated in FIG. 7C, writer process 705 has successfully requested that the buffer be resized. Writer process 704 failed to change the buffer state, but when it requested a new slot writer process 704 was suspended due to the new buffer state. Similarly, when reader process 708 attempts to reserve a slot, it is also suspended because the buffer state has changed. Reader process 707 reads out the data "A" from assigned slot 703-2 and null is written to the slot.

Buffer 701 may set a wait handle or "mutex" that blocks all processes or threads that try to reserve a new read or write index. For example, buffer 701 may set a state in the system that the buffer is being resized either by incrementing an internal field that indicates how many times the buffer has been resized or by setting a state variable.

Figure 7D:
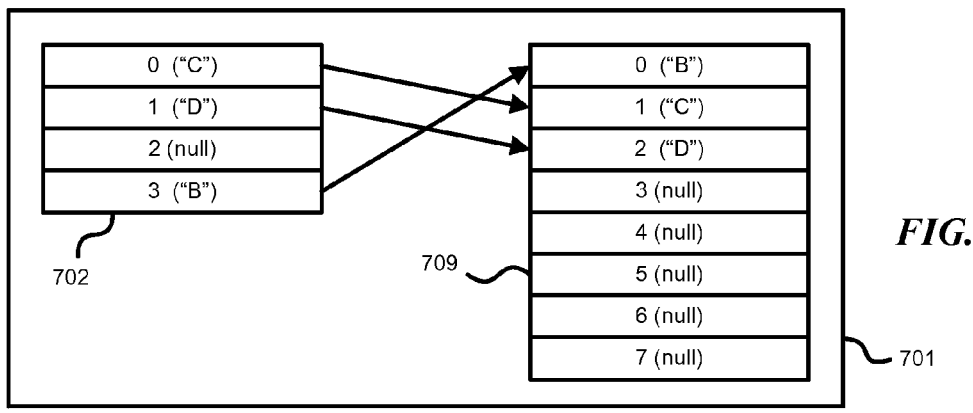

In FIG. 7D, the buffer 701 resizes its internal data structure 702. The number of buffer slots 702 is doubled in a new data structure 709. In other embodiments, the new data structure may be of any appropriate larger size. For example, the new buffer size may be a multiple (double, triple, etc.) of the original size, or the new buffer may be larger by a predetermined number of additional slots. The values in the old memory slots 702 are moved to the new memory slots 709. In one embodiment, the data is moved beginning with the value "B" in the slot 702-3 where the writer index 703 was pointing. In other embodiments, the data in the slot pointed to by the reader index will be transferred first. It will be understood that the data may be transferred in any order. As illustrated in FIG. 7D, the values are transferred sequentially to the new memory space 709. Any null values in the original memory slots are skipped so that the data is compacted and the new memory slots are filled consecutively. The values in the old memory space 702 are set to null after the values are transferred to the new slots. The old memory space 702 may be release back to the system for other uses after the values have been transfers to new space 709.

Figure 7E:
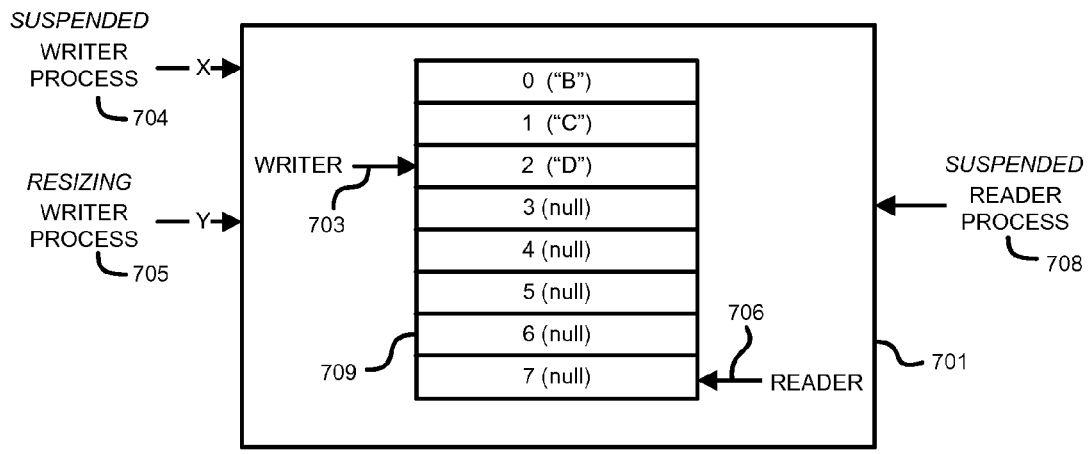

FIG. 7E illustrates buffer 701 after the storage slots have been resized and the data values transferred. The writer index 703 is set to the last non-null value (709-2) of the new buffer space. The reader index 706 to the last slot (709-7) in the buffer. Buffer 701 resets the wait handle or the mutex and unblocks all suspended or waiting processes 704, 708. The process 705 that resized buffer 701 will then reserve a new write slot because the index that it originally received is no longer valid after resizing of the buffer.

Figure 7F:
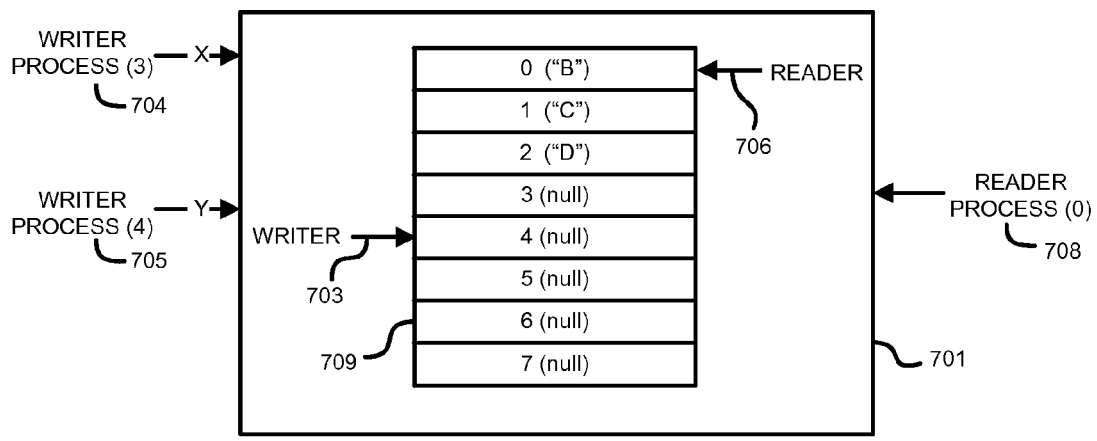
Figure 7G:
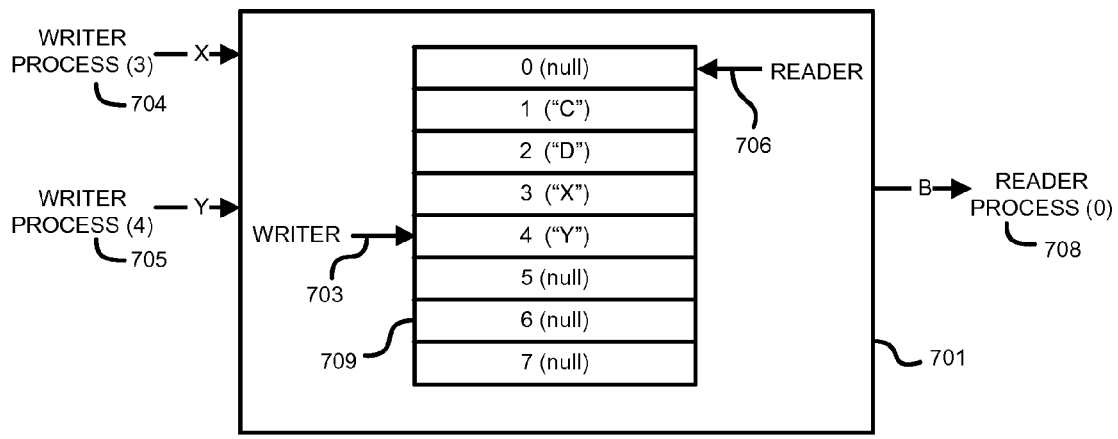

In FIG. 7F, writer processes 704 and 705 reserve slots 709-3 and 709-4 to write data by incrementing writer index 703. Reader process 708 increments reader index 706 and reserves slot 709-0 for reading out data. In FIG. 7G, writer processes 704 and 705 write data "X" and "Y," respectively, to slots 709-3 and 709-4. Reader process 708 reads out data "B" from slot 709-0. Buffer 701 sets slot 709-0 to null after the data is read out to indicate that the slot is available for new data from a new writer process.

In one embodiment, the resizing process has an implication to the reader threads. If the reader was able to reserve a slot using the reader index but that slot is null, there might be two reasons for the null slot. First, the writer processes may have been suspended before it had the chance to write data to the slot. Second, after the slot was assigned or while waiting for the data to be written, the buffer might have been resized. While waiting for data to be written, the read process may check if the buffer is being resized. If the buffer is being resized, the reader will reserve a new reader index.

When multiple writers try to write data, more than one writer process may detect that the buffer is already full; however, only one writer process will resize the buffer. All other processes or threads will be suspended while the buffer is being resized. New writer processes that make a request will be blocked because the method that reserves a slot checks if the buffer is being resized.

It is possible for a few readers to successfully reserve a slot to read, but before those readers can read the data, the buffer is resized. If the resize code moves data from the old buffer to the new buffer, then the slot in the old buffer will have a null value. This makes the reader process think that the writer process has not had a chance to write the data. As a result, the reader process will wait for the data and, while waiting, the reader process may see that the buffer is being resized. The reader process will then reserve a new slot because the old slot is no longer valid. While reserving the new slot, the code that reserves the slot is blocked until the resizing is done.

If the reader was able to read the data before the data is being moved from old buffer to the new buffer, then the slot in the old buffer will already be set to null. As a result, the resize method will not move the data, and the new buffer will be compacted.

The buffer may limit the ability to resize the memory slots. For example, it may need the ability to limit the number of times the buffer will be resized or limit the maximum size of the buffer. If deemed necessary, instead of resizing the buffer, the writer processes may be blocked until the readers read some data.

Figure 8:
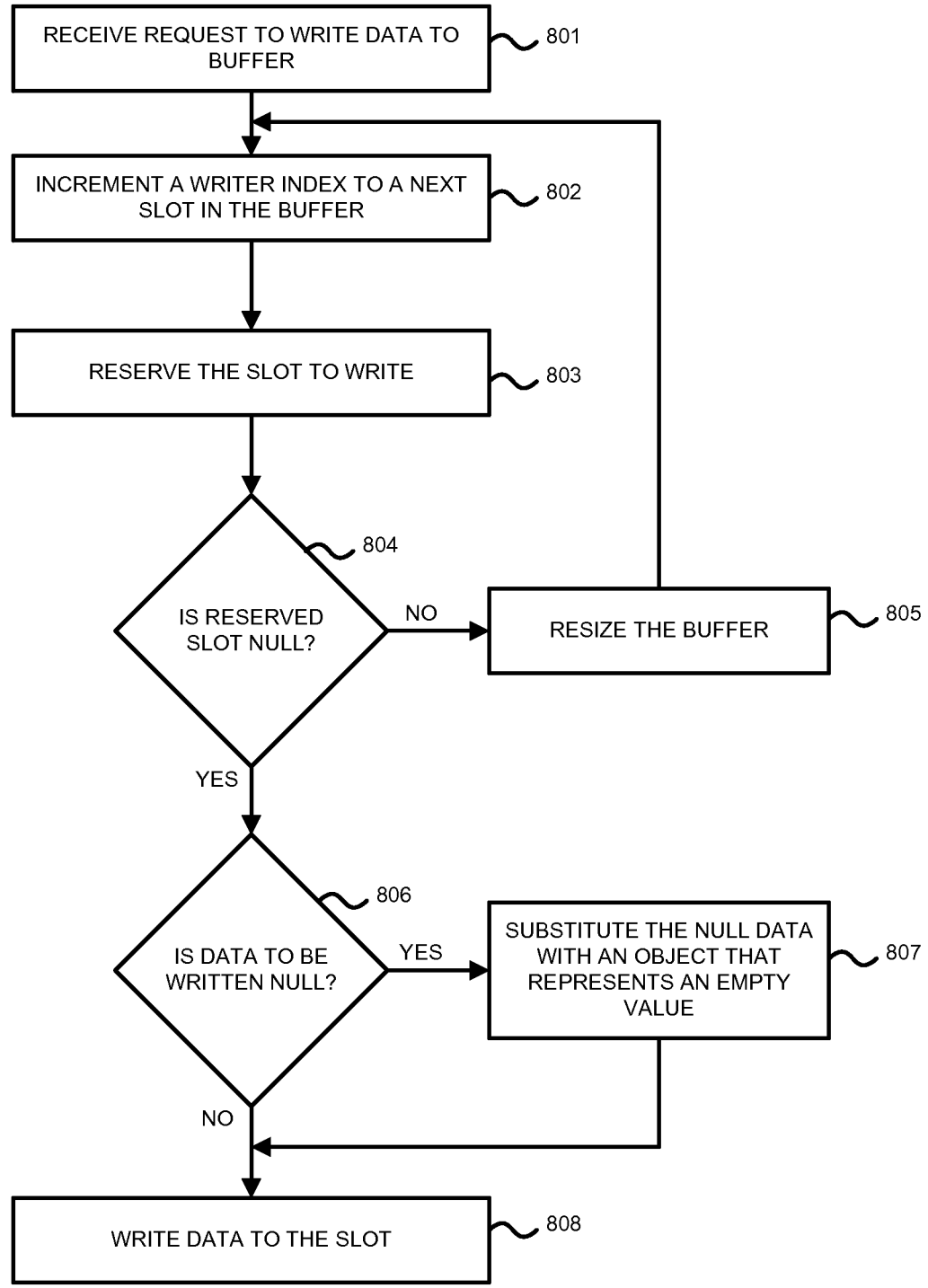
FIG. 8 is a flowchart illustrating a process or method for writing data to a buffer.

FIG. 8 is a flowchart illustrating a process or method for writing data to a buffer. The process begins at step 801 when a writer thread requests to write data to the buffer. In step 802, the buffer increments a writer index or pointer to a next slot. That slot is reserved for the write thread in step 803. In step 804, the process evaluates whether the reserved slot is null. If the reserved slot is non-null—meaning that it is already holding data—then the process moves to step 805 and the buffer is resized to create additional space. An example method for resizing the buffer is described below in connection with FIG. 10. When the buffer has been resized in step 805, the process returns to step 802 where a new slot is assigned to the writer thread. All calls to the buffer to reserve slots are blocked while the buffer is resized. In one embodiment, only one writer thread at a time may initiate a buffer resize. All other writer threads are suspended during the resize process.

If the reserved slot is null in step 804, then the process evaluates whether the data to be written by the writer thread is null in step 806. As noted above, because the slots of the buffer are set to null to indicate slot availability for writing, it would be confusing to store null data values to the slots. If the data to be written is null, then the process moves to step 807 where the null data is replaced with an object that represents an empty data value. The empty data object may be any unique value that has been designated by the buffer or writer thread to represent null data. The process then moves to step 808 and the data from the writer thread or the empty data value is written to the reserved slot.

Figure 9:
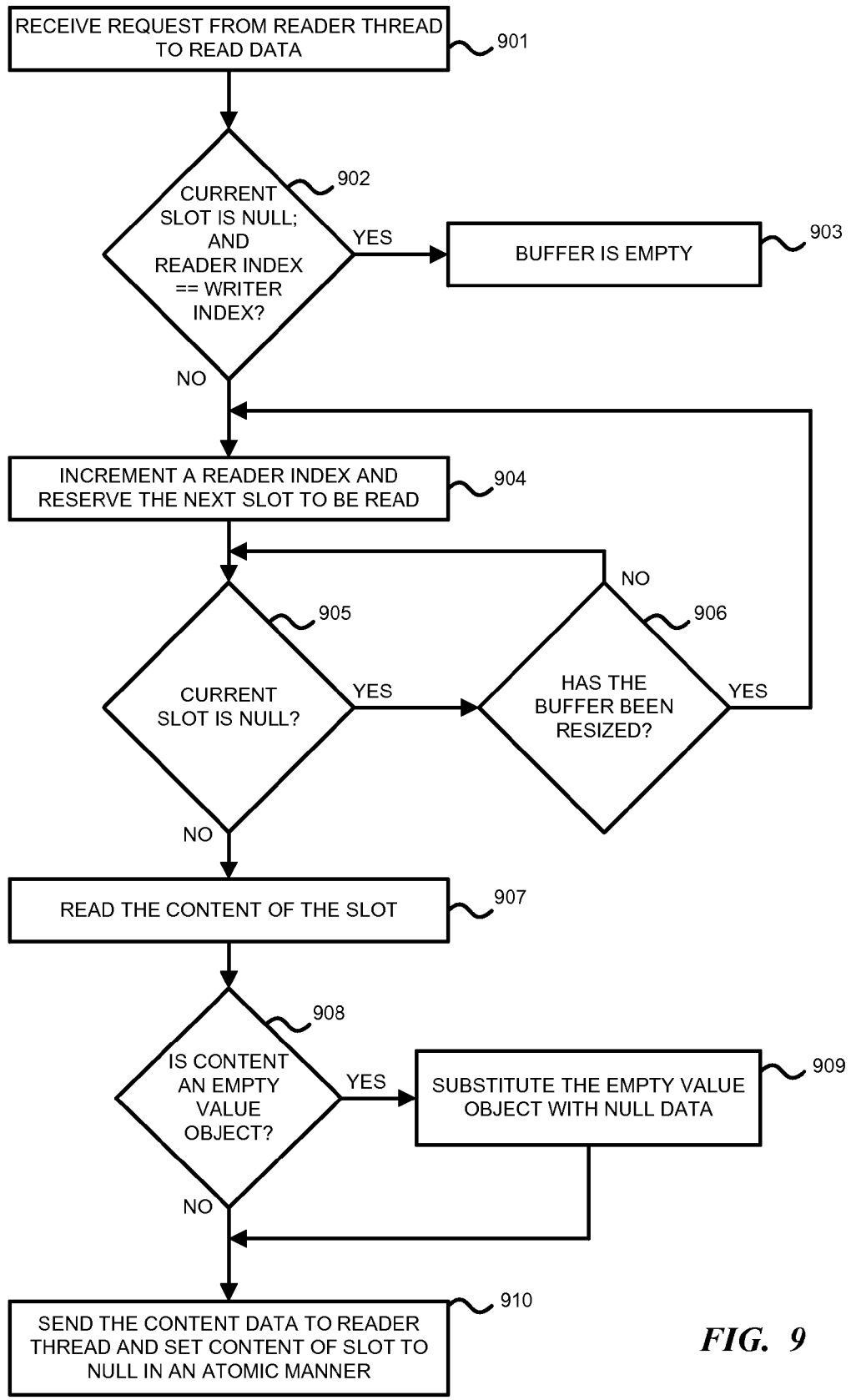
FIG. 9 is a flowchart illustrating a process or method for reading data from a buffer.

FIG. 9 is a flowchart illustrating a process or method for reading data from a buffer. The process begins at step 901 when a reader thread requests data from the buffer. In step 902, the buffer evaluates whether the reader index and writer index are pointing to the same slot and, if so, whether the slot is null. If those conditions are true in step 902, then the buffer is empty and the process moves to step 903.

If the buffer is not empty in step 902, then the process moves to step 904 and the buffer reserves a slot to be read by the reader thread. In step 905, the buffer again determines whether the slot content is null. If the conditions in step 905 are true, then the process moves to step 906 and the buffer evaluates whether the buffer has been resized since the slot was reserved. If the buffer has been resized, then the process returns to step 904 and a new slot is reserved for the reader thread. If the buffer has not been resized in step 906, then the process returns to step 905 to determine if data has been written to the slot yet.

If the conditions in step 905 are not true, then the process moves to step 907 and the content of the reserved slot are read. In step 908, the buffer determines if the content of the reserved slot corresponds to an empty value object. If the content is an empty value object, then the process moves to step 909 and the empty value object is replaced with null data.

If the content of the reserved slot is not an empty value object in step 908, or after an empty value object has been replaced with null data in step 909. In step 910, the process reads out the slot content data to the reader and sets the slot content to null in one step in an atomic manner.

Figure 10:
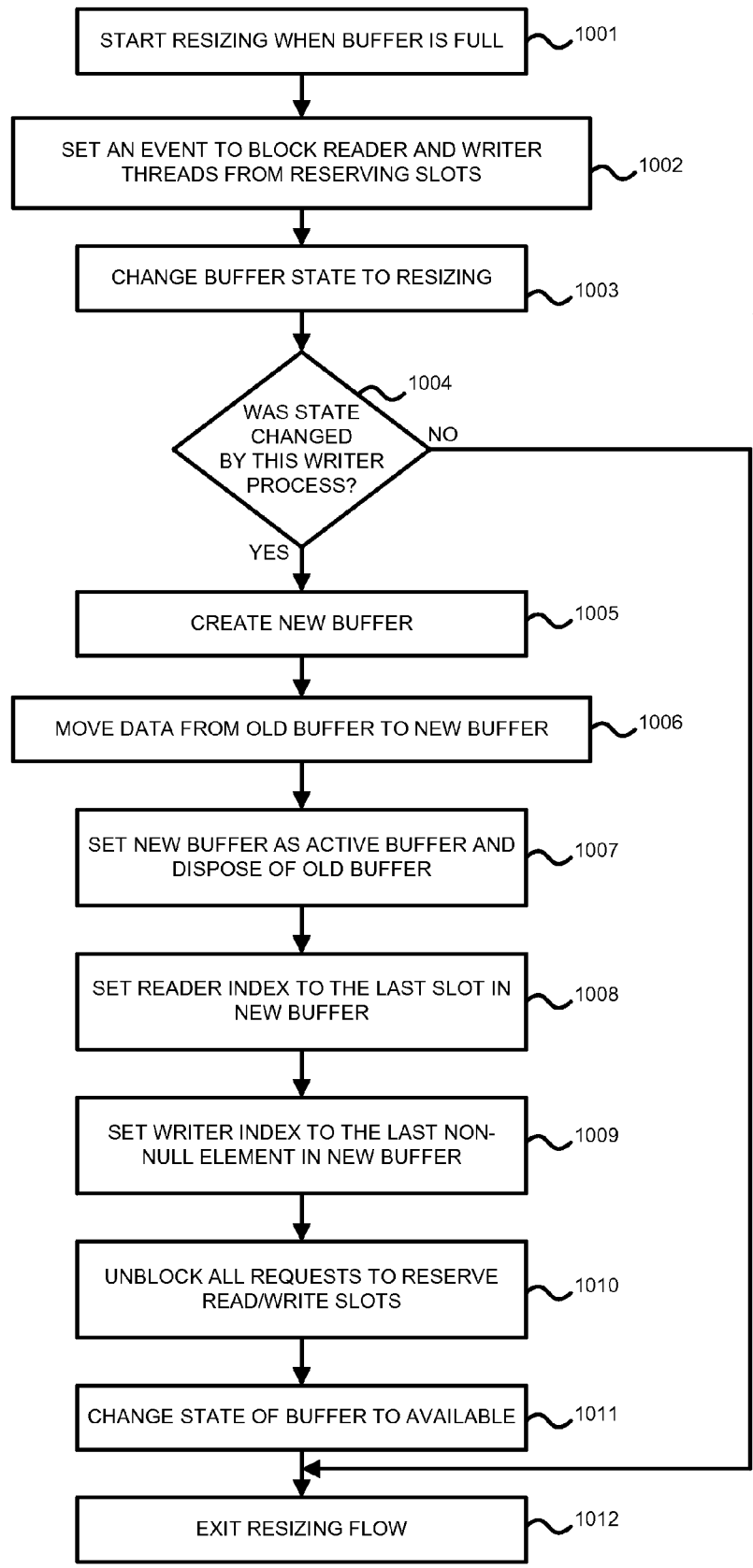
FIG. 10 is a flowchart illustrating a method or process for resizing a buffer.

FIG. 10 is a flowchart illustrating a method or process for resizing a buffer. The resizing flowchart of FIG. 10 may be used in conjunction with the write flowchart illustrated in FIG. 8. The resizing flowchart is a sub-flow of the write flowchart. In step 1001, the buffer determines that it should be resized. The resizing process may be triggered, for example, as a result of step 805 in FIG. 8 when a writer process determines that there is no room to write data to the buffer. In step 1002, the buffer sets an event to block reader or writer threads from reserving slots during the resizing process. In step 1003, the buffer changes a state indication to a resizing state. In step 1004, the writer thread evaluates whether the resizing state was successfully changed. If the writer thread was successful in changing the state, then it resizes the buffer and the flow moves to step 1005.

When several writers try to resize the buffer, they are competing to change the resizing state, but only one will be able to change the state. Each writer evaluates whether it was the thread that changed the state. The writer that successfully changed the state will resize the buffer, while the other threads simply exit the resizing flowchart. A writer that was unable to change the buffer's state simply waits until the buffer is finish resizing. From the write flowchart, after each writer thread goes to the resizing flowchart (regardless whether the thread resizes the buffer or not), the writer threads requests a new writer index slot. While the buffer is resizing, all requests to new writer indexes and reader indexes are blocked.

When the buffer state is successfully changed to resizing by the writer thread, then the process moves to step 1005 where a new buffer is created. The new buffer may be double the size of the original buffer in one embodiment. In other embodiments, the new buffer size may be some other multiple of the original buffer (i.e. new buffer=X×original buffer) or may be a preselected number of slots bigger than the original buffer (i.e. new buffer=X+original buffer). The size of the new buffer may selected based upon criteria such as the number of times the buffer was resized within a predetermined period (i.e. buffer resize velocity), the size of available buffer memory space, the number of active writer threads and/or reader threads, etc.

In step 1006, the data from the original buffer is moved to the new buffer. In one embodiment, the data is moved starting with the oldest data first. As the data is moved from slots in the original buffer, the slots may be set to null. If a slot in the original buffer is already null, then that slot is skipped and the null data is not transferred to the new buffer, which allows the data to be compacted into a contiguous section of the new buffer. Once all the data has been moved, the new buffer may be set as the active buffer and the old buffer may be deleted, disposed, or released in step 1007.

In step 1008, the reader index is reset to point to the last slot in the new buffer. This will cause the next read request to increment the reader index to point to the beginning of the buffer. In step 1009, the writer index is set to point to the last non-null element in the new buffer, which corresponds to the last data transferred from the old buffer. This will cause the next write request to increment the writer index to point to the first available slot in the new buffer.

In step 1010, the buffer unblocks the requests to reserve slots for new reads/writes. In step 1011, the buffer changes its state from the resizing state to available. Additional writer threads may now access the buffer and will have room to store new data. In step 1012, the buffer has been resized and the buffer state is no longer resizing, so the writer process exists the resizing flow. If another writer thread had been unsuccessful in step 1003 to change the buffer state to resizing, then that unsuccessful writer would complete the evaluation in step 1004 and would move to step 1012. In one embodiment, after step 1012, the writer processes move to step 802 in the writer flowchart and request a new writer slot.

It will be understood that steps of the processes illustrated in FIGS. 8-10 may be executed simultaneously and/or sequentially. Additionally, in some embodiments, multiple writer threads and multiple reader threads may operate at the same time to simultaneously write data to and read data from the buffer. It will be further understood that each step may be performed in any order and may be performed once or repetitiously.

Figure 11:
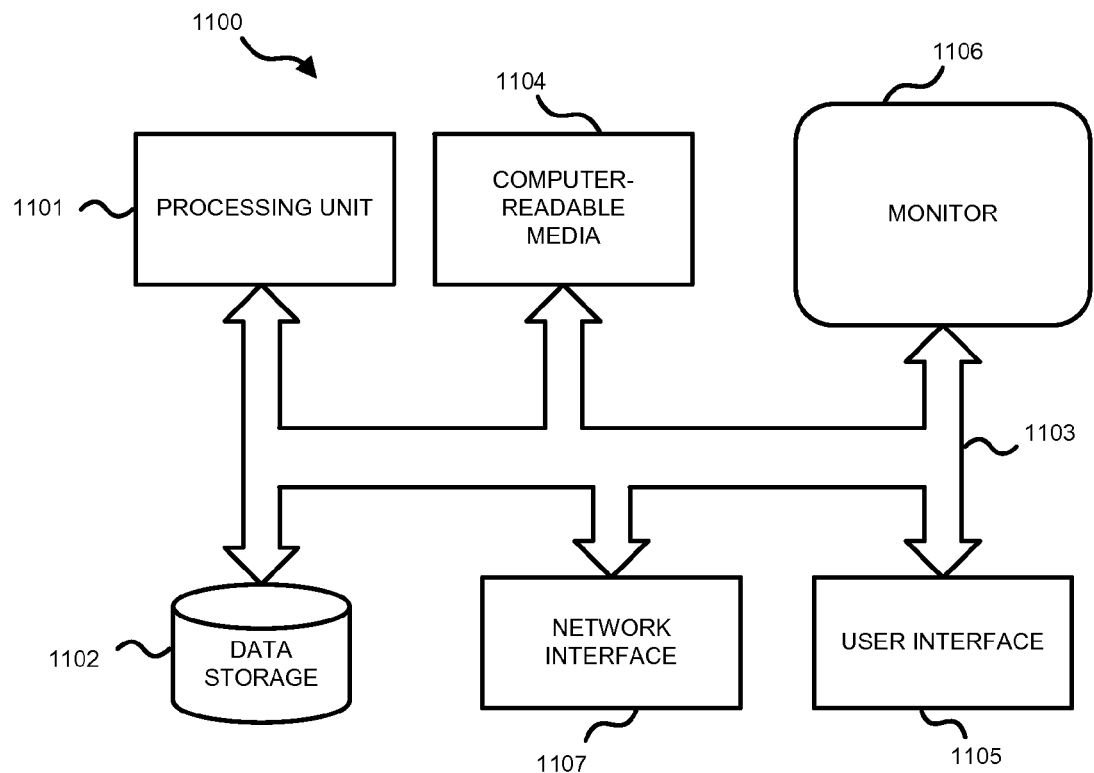
FIG. 11 illustrates an example of a suitable computing and networking environment for providing and using buffers according to the examples herein.

FIG. 11 illustrates an example of a suitable computing and networking environment 1100 on which the examples of FIGS. 1-10 may be implemented. Computer system 1100 may provide one or more multi-threaded buffers as described above. The computing system environment 1100 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 11, an exemplary system for implementing various aspects of the invention may include a general purpose computing device in the form of a computer 1100. Components may include, but are not limited to, various hardware components, such as processing unit 1101, data storage 1102, such as a system memory, and system bus 1103 that couples various system components including the data storage 1102 to the processing unit 1101. Data storage 1102 may provide or support a buffer for storing data and providing write, read, and resizing functionality as described herein. The system bus 1103 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1100 typically includes a variety of computer-readable media 1104. Computer-readable media 1104 may be any available media that can be accessed by the computer 1100 and includes both volatile and nonvolatile media, and removable and non-removable media, but excludes propagated signals. By way of example, and not limitation, computer-readable media 1104 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 1102 includes computer storage media in the form of volatile and/or nonvolatile memory such as read only memory (ROM) and random access memory (RAM). A basic input/output system (BIOS), containing the basic routines that help to transfer information between elements within computer 1100, such as during start-up, is typically stored in ROM. RAM typically contains data and/or program modules that are immediately accessible to and/or presently being operated on by processing unit 1101. By way of example, and not limitation, data storage 1102 holds an operating system, application programs, and other program modules and program data.

Data storage 1102 may also include other removable/non-removable, volatile/nonvolatile computer storage media. By way of example only, data storage 1102 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 11, provide storage of computer-readable instructions, data structures, program modules and other data for the computer 1100.

A user may enter commands and information through a user interface 1105 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 1101 through a user input interface 1105 that is coupled to the system bus 1103, but may be connected by other interface and bus structures, such as a parallel port, game port or a universal serial bus (USB). A monitor 1106 or other type of display device is also connected to the system bus 1103 via an interface, such as a video interface. The monitor 1106 may also be integrated with a touch-screen panel or the like. Note that the monitor and/or touch screen panel can be physically coupled to a housing in which the computing device 1100 is incorporated, such as in a tablet-type personal computer. In addition, computers such as the computing device 1100 may also include other peripheral output devices such as speakers and printer, which may be connected through an output peripheral interface or the like.

The computer 1100 may operate in a networked or cloud-computing environment using logical connections 1107 to one or more remote devices, such as a remote computer. The remote computer may be a personal computer, a server, a router, a network PC, a peer device or other common network node, and typically includes many or all of the elements described above relative to the computer 1100. The logical connections depicted in FIG. 11 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1100 may be connected to a public or private network through a network interface or adapter 1107. In some embodiments, a modem or other means for establishing communications over the network. The modem, which may be internal or external, may be connected to the system bus 1103 via the network interface 1107 or other appropriate mechanism. A wireless networking component such as comprising an interface and antenna may be coupled through a suitable device such as an access point or peer computer to a network. In a networked environment, program modules depicted relative to the computer 1100, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receive a request from a writer process executing on a processor to write data to a buffer;
increment a writer index to a next slot in the buffer;
reserve a first write slot for the writer process; and
write data from the writer process to the first write slot;
receive a request from a reader process to read data from the buffer;
increment a reader index to reserve a read slot for the reader process;

read the content of the read slot and set the slot content to null in an atomic manner;
if the read slot content is null, then determine whether the buffer has been resized;
if the buffer has been resized, increment the reader index;
reserve a new read slot for the reader process; and
read the content of the new read slot and set the slot content to null in an atomic manner.

2. The method of claim 1, further comprising:
identify when the content of the first write slot is not null; and
resize the buffer if the first write slot content is not null.

3. The method of claim 1, further comprising:
identify when the data from the writer process is null data;
substitute the null data with an empty value object; and
write the empty value object to the first write slot.

4. The method of claim 1, further comprising:
receive a request from a second writer process to write data to the buffer;
increment the writer index to a second write slot in the buffer;
reserve the second write slot for the second writer process; and
write data from the second writer process to the second write slot.

5. The method of claim 1, wherein the buffer is an array or a circular linked list.

6. The method of claim 1, further comprising:
if the content of the read slot is an empty value object, replace the empty value object with null data; and
provide the null data to the reader process.

7. A method for resizing a buffer, comprising:
determine an original buffer is full when content of a slot that is reserved for a new writer process executing on a processor is not null;
create a new buffer;
move data from slots in the original buffer to slots in the new buffer;
set a reader index to point to last slot in new buffer;
set a writer index to point to last non-null element in new buffer;
receive a request from the writer process to write data to the buffer;
increment the writer index to a next slot in the buffer;
reserve a first write slot for the writer process; and
write data from the writer process to the first write slot.

8. The method of claim 7, wherein moving data from slots in the original buffer to slots in the new buffer compacts the data by skipping null slots in the original buffer and filling slots in the new buffer sequentially.

9. The method of claim 7, further comprising:
set slots in the original buffer to null as data is moved to slots in the new buffer; and
dispose of original buffer when all data has been moved.

10. The method of claim 7, further comprising:
block writer processes and reader processes from reserving slots in the original buffer; and
after all data has been moved to the new buffer, allow writer processes and reader processes to reserve slots in the new buffer.

11. The method of claim 7, further comprising:
set a buffer state to a resizing state; and
after all data has been moved to the new buffer, set the buffer state to a non-resizing state.

12. The method of claim 7, wherein the new buffer is larger than the original buffer by a preselected multiple or by a preselected number of slots.

13. The method of claim 7, wherein a new buffer size is selected based upon a frequency of buffer resizing.

14. A computer-readable storage device not comprising a propagated signal or wave storing computer-executable instructions that when executed by at least one processor cause the at least one processor to perform a method for writing and reading data to a buffer, the method comprising:
receiving a request from a reader process to read data from the buffer;
incrementing a reader index;
reserving a read slot for the reader process;
sending the content of the read slot to the reader process and set the slot content to null in an atomic manner;
if the read slot content is null, then determining whether the buffer has been resized;
if the buffer has been resized, incrementing the reader index;
reserving a new read slot for the reader process;
reading the content of the new read slot and set the slot content to null in an atomic manner;
receiving a request from a writer process to write data to the buffer;
incrementing a writer index to a next slot in the buffer;
reserving a first write slot for the writer process; and
writing data from the writer process to the first write slot.

15. The computer-readable storage device of claim 14, wherein the method further comprises:
identifying when the data from the writer process is null data;
substituting the null data with an empty value object;
writing the empty value object to the first write slot;
if the content of the read slot is the empty value object, replacing the empty value object with null data; and
providing the null data to the reader process.

16. The computer-readable storage device of claim 14, wherein the method further comprises:
identifying when the content of the first write slot is not null; and
resizing the buffer if the first write slot content is not null.

* * * * *